United States Patent [19]

Suchcicki

[11] 3,813,131
[45] May 28, 1974

[54] SNOW TRACTION DEVICE FOR MOTOR VEHICLES

[76] Inventor: Henry J. Suchcicki, 1202 Hollywood Dr., Reading, Pa. 19606

[22] Filed: Nov. 10, 1972

[21] Appl. No.: 305,442

[52] U.S. Cl. .............................................. 305/29
[51] Int. Cl. .......................................... B62d 55/04
[58] Field of Search ............ 180/9.5, 9.54; 305/20, 305/35 EB, 31, 32

[56] References Cited
UNITED STATES PATENTS

| | | | |
|---|---|---|---|
| 1,117,139 | 11/1914 | Ohmstead | 305/20 |
| 1,256,744 | 2/1918 | Tolsma | 305/31 X |
| 3,349,861 | 10/1967 | Oral | 180/9.54 |

FOREIGN PATENTS OR APPLICATIONS

| | | | |
|---|---|---|---|
| 704,147 | 2/1931 | France | 305/20 |

*Primary Examiner*—Richard J. Johnson

[57] ABSTRACT

A pair of vehicle rear guide wheels is coupled by a pair of linkages to a corresponding rear side member extension. Each linkage which is spring loaded and makes use of a shock absorber. A pair of endless cleated belts extend around and between each rear wheel guide wheel pair.

1 Claim, 4 Drawing Figures

PATENTED MAY 28 1974　　　　　　　　　　　　　　　　　　　　3,813,131
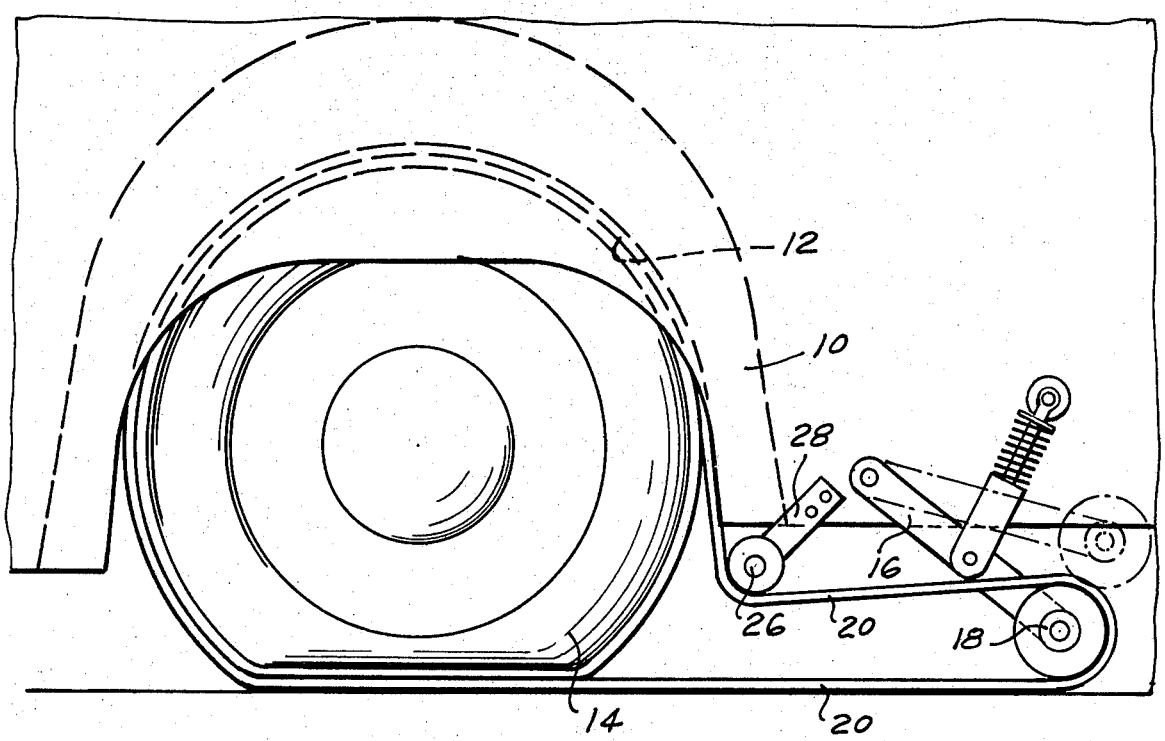
FIG. 1
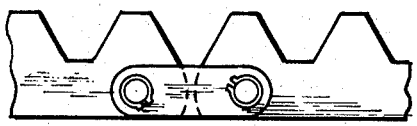
FIG. 3
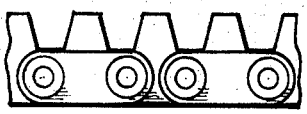
FIG. 4
FIG. 2
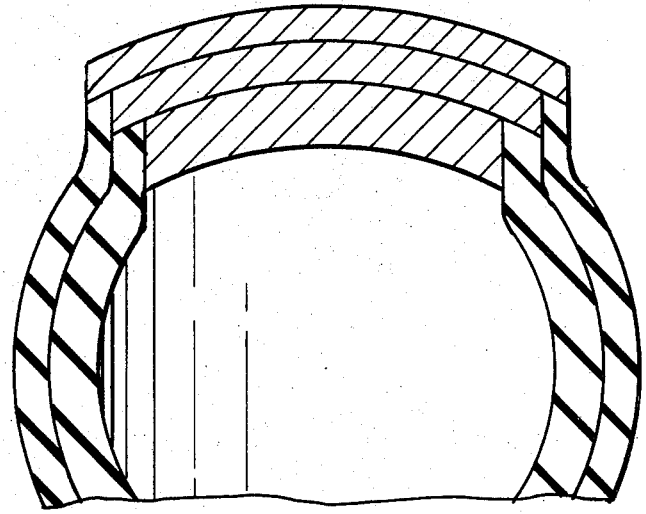

SNOW TRACTION DEVICE FOR MOTOR VEHICLES

FIELD OF THE INVENTION

My invention is directed toward an attachment for motor vehicles which enables the vehicles to have substantially enhanced traction in snow.

SUMMARY

An additional vertical guide wheel is coplanar with each rear vehicle wheel and freely rotatable and disposed rearwardly of the rear wheel. The diameter of each guide wheel is much smaller than its rear wheel and the bottom portions of both wheels are at the same horizontal level. An endless cleated belt is disposed around and extends between each rear wheel-rear guide wheel pair. This belt thus contacts a much larger area on the ground than the rear wheel above. Consequently traction in snow and ice is correspondingly increased. This substantial increase in traction sharply increases speed of movement and sharply reduces accidents.

BRIEF DESCRIPTION OF THE DRAWINGS

In the drawings:

FIG. 1 is a side elevation of my invention;

FIG. 2 is a cross section of tire widths and belts as used in my invention;

FIG. 3 is a detail of an endless belt used in my invention; and

FIG. 4 is a detail of the opposite side of the belt of FIG. 3.

DETAILED DESCRIPTION OF PREFERRED EMBODIMENTS

A vehicle has a rear wheel well 10 opening 12 exposing rear wheel 14. A spring loaded linkage 16 pivotally secured at one end to the frame at the rear of the opening is secured at its other end to a vertical rear guide wheel 18 freely rotatable in the same vertical plane as wheel 14. The linkage can be swung up to hold wheel 18 out of the way or can be swung down until the bottom surface of wheel 18 is horizontally aligned with the bottom surface of wheel 14. In this last position, an endless belt 20 having opposite ends connected by linkage 22 and having cleats 24 is disposed around and between wheels 14 and 18 to provide additional traction as described.

An idler wheel 26 connected by linkage 28 to the rear frame intermediate wheels 14 and 18 bears downward against the top surface of belt 20 to hold same taut as shown. The width of the belt used is always somewhat wider than that of the tire 30 used for optimum efficiency as shown.

While I have described my invention with particular reference to the drawings, such is not to be considered as limiting its actual scope.

I claim:

1. In combination with an automotive vehicle having a pair of driven pneumatic rear wheels and having a body frame, each wheel having associated therewith a link disposed longitudinally in the same plane as said rear wheels and spaced from the corresponding rear wheel with one end pivoted to said frame and with a guide wheel pivotally mounted on the other end, an endless cleated belt entrained about each rear wheel and about the guide wheel, an intermediate idler wheel being of smaller diameter than the guide wheel secured to said body frame and arranged to push the belt generally downwardly away from said frame, a shock absorber including a compression spring connected to an intermediate portion of said link to normally hold the guide wheel at ground level and permit upward pivotal lifting thereof and retraction from ground level by overcoming the compression of said spring when additional traction is not needed, whereby a relatively long stretch of belt may be maintained on the ground to provide considerable traction.

* * * * *